C. EICHELBERGER.
AUTO LIFTING JACK AND TIRE SAVER.
APPLICATION FILED JULY 18, 1917.
1,269,267. Patented June 11, 1918.
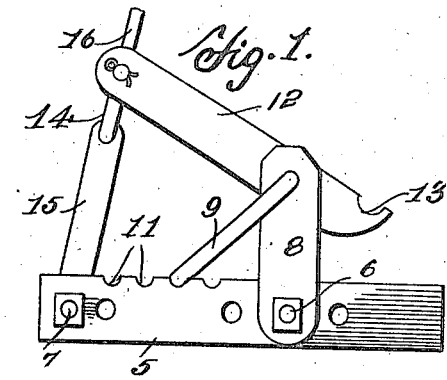
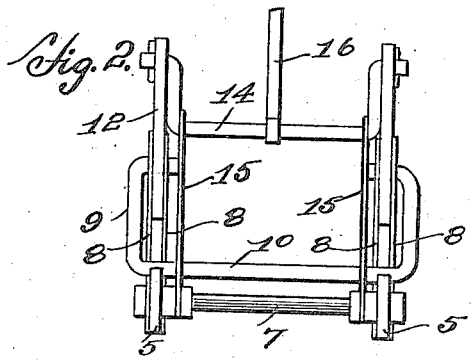
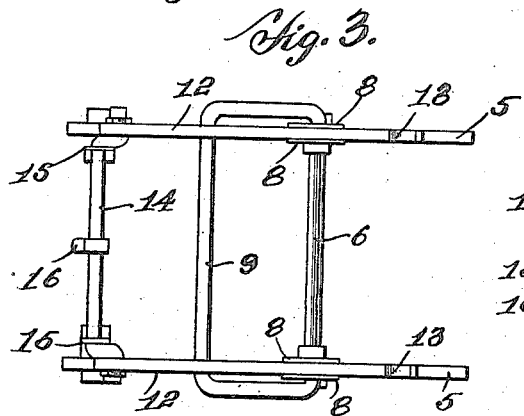
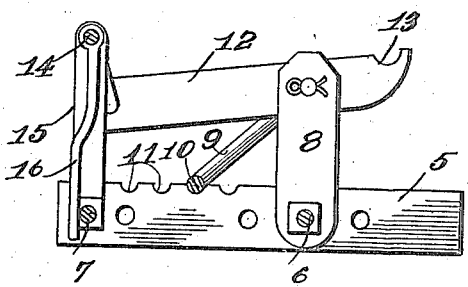
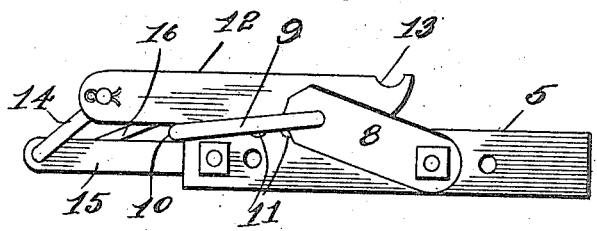
Witness
O. H. Cook
Inventor
C. Eichelberger
By Chandler & Chandler
Attorneys

UNITED STATES PATENT OFFICE.

CHRISTIAN EICHELBERGER, OF SHICKLEY, NEBRASKA.

AUTO LIFTING-JACK AND TIRE-SAVER.

1,269,267.   Specification of Letters Patent.   Patented June 11, 1918.

Application filed July 18, 1917.   Serial No. 181,310.

*To all whom it may concern:*

Be it known that I, CHRISTIAN EICHELBERGER, a citizen of the United States, residing at Shickley, in the county of Fillmore, State of Nebraska, have invented certain new and useful Improvements in Auto Lifting-Jacks and Tire-Savers; and I do hereby declare the following to be a full, clear, and exact description of the invention, such as will enable others skilled in the art to which it appertains to make and use the same.

This invention relates to improvements in vehicle jacks and has for an object the provision of a simple, novel and inexpensive device of this character by means of which both of the front wheels or both of the rear wheels of a vehicle may be simultaneously raised from the ground for purposes of repair or for relieving the weight from and thus prolonging the life of pneumatic tires.

A further object of the present invention is to provide an appliance of the above character which is adjustable to accommodate vehicles of different sizes and is furthermore collapsible in novel manner so as to offer no obstruction to a vehicle driven thereover and to also facilitate its storage and transportation.

With the above and other objects of similar nature in view, the invention consists in the construction, combination and arrangement of parts, set forth in and falling within the scope of the appended claims.

In the drawing:—

Figure 1 is a side elevation of a vehicle jack constructed in accordance with the invention, Fig. 2 is an end view thereof, Fig. 3 is a top plan view, Fig. 4 is a vertical longitudinal sectional view showing the parts in their operative position, and Fig. 5 is a side view of the jack collapsed.

Referring now more particularly to the accompanying drawing, the improved vehicle jack consists of a spaced parallel base members 5 that are rigidly connected by means of transverse bars 6 and 7. Pivoted for horizontal adjustment to the bar 6 adjacent its ends are bracket arms 8, the same being connected by means of a substantially U-shaped adjusting yoke 9 and being maintained in adjusted position by selective engagement of the bight portion 10 of said yoke in series of notches 11 provided in the upper faces of the members 5 as will be understood. Supported from the free ends of the arms 8 by pivotal engagement with the terminals of the yoke 9 are a pair of lifting bars 12 the upper face of which at their forward ends are provided with recess 13 adapted to receive the axle of the vehicle to be elevated. At their rear ends the lifting bars 12 are connected for simultaneous vertical movement by means of a substantially U-shaped operating yoke 14 said yoke in turn being pivotally supported upon rocker arms 15 carried pivotally by the transverse bar 7.

A lever 16 is fixed to the yoke 14 centrally of its bight portion whereby said yoke may be actuated with said rocker arms 15 as a fulcrum, to raise and lower the lifting bars 12.

In use the jack is positioned beneath the axle of the vehicle to be elevated with the same resting within corresponding recesses 13 in the lifting bars. The operating yoke 14 is then actuated to swing the lifting bars on their pivotal connection with the rocker arms and thereby elevate the adjacent portion of the vehicle until the wheels are clear of the ground and the lever 16 of the yoke engaged with the adjacent transverse bar 7. Further movement of the yoke in this direction is consequently prevented while it will be noted that when the elements are so disposed the fulcrum of the yoke will have moved beyond the pivotal centers of the rocker arms 15 and the legs of the yoke, the lifting bars being thus maintained in elevated position until the yoke is actuated in the opposite direction. When it is desired to collapse the jack the adjusting yoke 9 is disengaged from the notches and the parts moved to the position illustrated in Fig. 5, the resultant structure being extremely compact so that a vehicle driven onto or from the jack will meet with no obstruction. This collapsed form of the jack will also facilitate its storage or transportation as it occupies but little space.

What I claim is:—

1. A vehicle jack comprising spaced base members, bracket arms pivoted to said base members, a U shaped adjusting yoke carried by said bracket arms, axle engaging lifting bars rotatably mounted on said U shaped adjusting yoke, rocker arms pivoted to said base members, a U shaped operating yoke carried by said rocker arms and pivoted to said lifting bars for raising and lowering the latter, and means for operating said operating yoke.

2. A vehicle jack comprising spaced base members, bracket arms pivoted to said base members, a U shaped adjusting yoke carried by said bracket arms and arranged for engagement with the base members, axle engaging lifting bars rotatably mounted on said U shaped adjusting yoke, rocker arms pivoted to said base members, a U shaped operating yoke rotatably mounted in said rocker arms and pivoted to said lifting bars for raising and lowering the lifting bars respectively of the adjusting yoke and bracket arms, and means for operating said operating yoke.

3. A vehicle jack comprising spaced base members, bracket arms pivoted to the forward portions of said base members, a U shaped adjusting yoke rotatably mounted in the upper ends of said bracket arms and arranged for engagement with the base members said adjusting yoke coöperating with the bracket arms in the adjusting operation, axle engaging lifting bars rotatably mounted at their forward portions on the pivoted ends of the U shaped adjusting yoke, rocker arms pivoted to the rear portions of the base members, a U shaped operating yoke rotatably mounted in the upper ends of said rocker arms and pivoted at its ends to the rear portions of the lifting bars for raising and lowering the latter, and means for operating said operating yoke.

In testimony whereof, I affix my signature in the presence of two witnesses.

CHRISTIAN EICHELBERGER.

Witnesses:
SELMA VENELL,
WILLIAM G. MATZKE.

Copies of this patent may be obtained for five cents each, by addressing the "Commissioner of Patents, Washington, D. C."